United States Patent
Mahiddini et al.

(10) Patent No.: US 6,751,649 B1
(45) Date of Patent: Jun. 15, 2004

(54) SERVER FOR SEARCHING FOR INFORMATION IN A NETWORK OF DATABASES

(75) Inventors: Patrice Mahiddini, Colombes (FR); Christopher Levallet, Levallois-Perret (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/550,170

(22) Filed: Apr. 14, 2000

(30) Foreign Application Priority Data

Apr. 15, 1999 (FR) .......................... 99 04715

(51) Int. Cl.[7] ............................................. G06F 15/16
(52) U.S. Cl. ............................. 709/203; 707/1; 707/4; 707/10; 707/103
(58) Field of Search .................. 709/203; 707/1, 707/4, 10, 103

(56) References Cited

U.S. PATENT DOCUMENTS

| | | | |
|---|---|---|---|
| 5,890,152 A | | 3/1999 | Rapaport et al. |
| 6,108,645 A | * | 8/2000 | Eichstaedt et al. ............. 707/1 |
| 6,304,864 B1 | * | 10/2001 | Liddy et al. .................. 706/15 |

FOREIGN PATENT DOCUMENTS

| | | |
|---|---|---|
| EP | EP 0 848 338 A1 | 6/1998 |
| WO | WO 98/26357 | 6/1998 |

OTHER PUBLICATIONS

Hsiangchu Lai et al: "A system architecture of intelligent-guided browsing on the Web" Proceedings of the Thirty-First Hawaii International Conference on System Sciences (CAT. NO. 98TB100216), Kohala Coast, HI, USA, Jan. 6–9, 1998, pp. 423–432, col. 4, XP002128394.

* cited by examiner

Primary Examiner—John Follansbee
Assistant Examiner—Jinsong Hu
(74) Attorney, Agent, or Firm—Sughrue Mion, PLLC

(57) ABSTRACT

The invention relates to a server to facilitate searching for information in a network of databases, such as the Internet, said server including a database containing the addresses of the databases of the network and information on the contents of the bases. The server includes storage means for storing data characteristic of users, said data being selected, for each user, from the group including the following characteristics: home or place of work, age, sex, address, interests, personal details, ability to use data processing tools and hardware characteristics, wherein the server includes means for selecting, allowing for the characteristics of the user, the database addresses to be supplied to the user and the presentation of the selection.

8 Claims, 3 Drawing Sheets

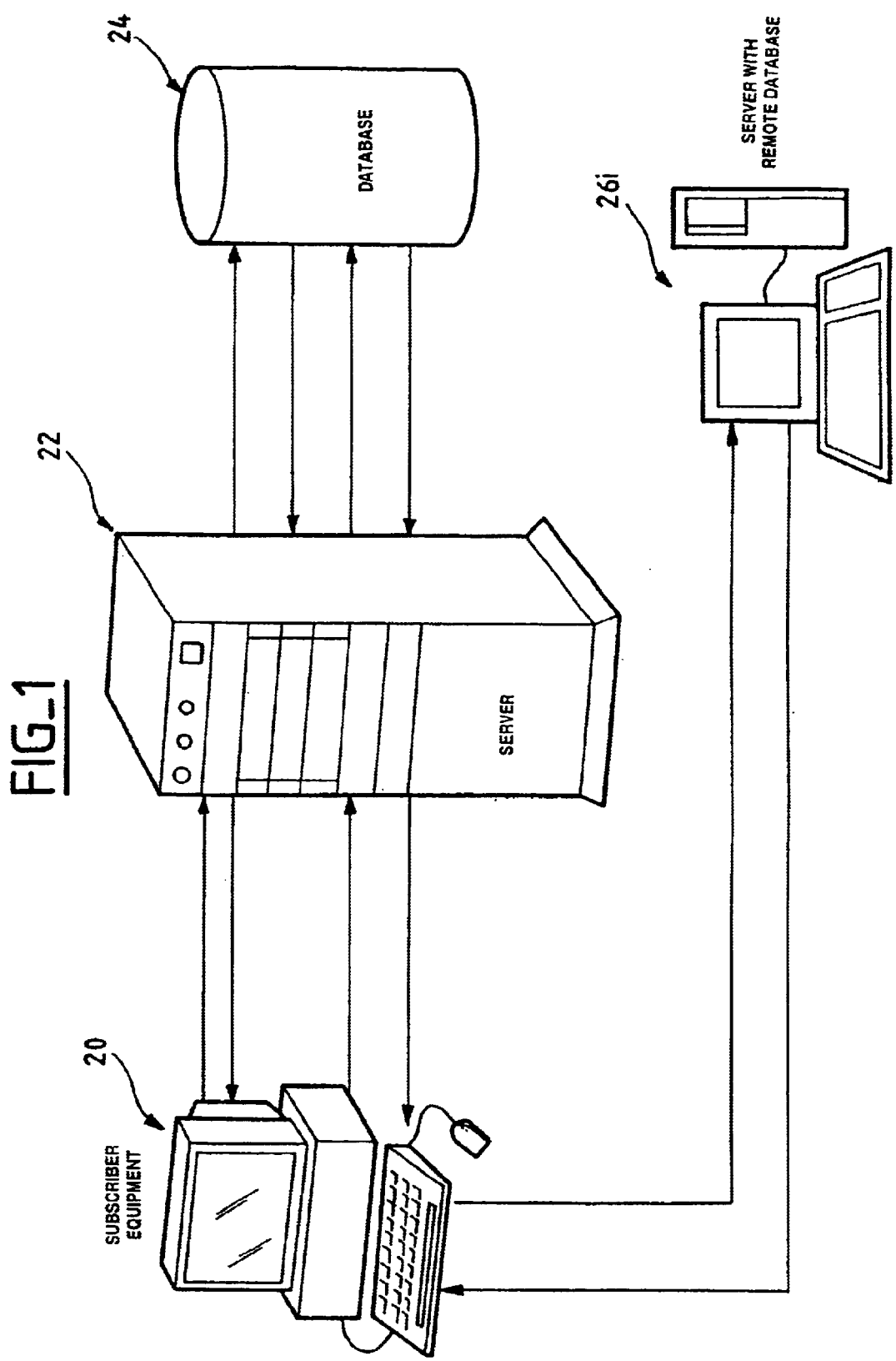
FIG_1

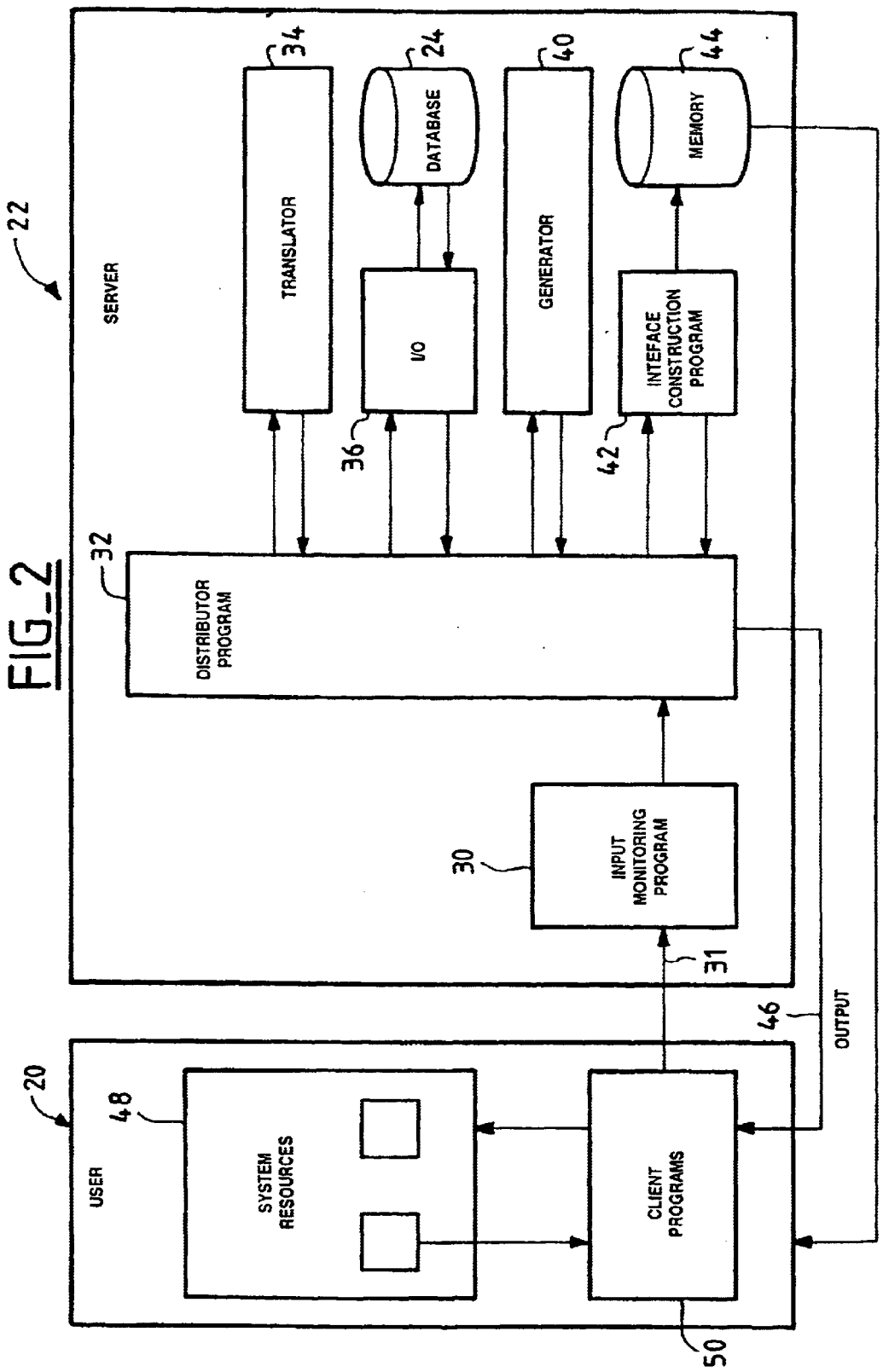

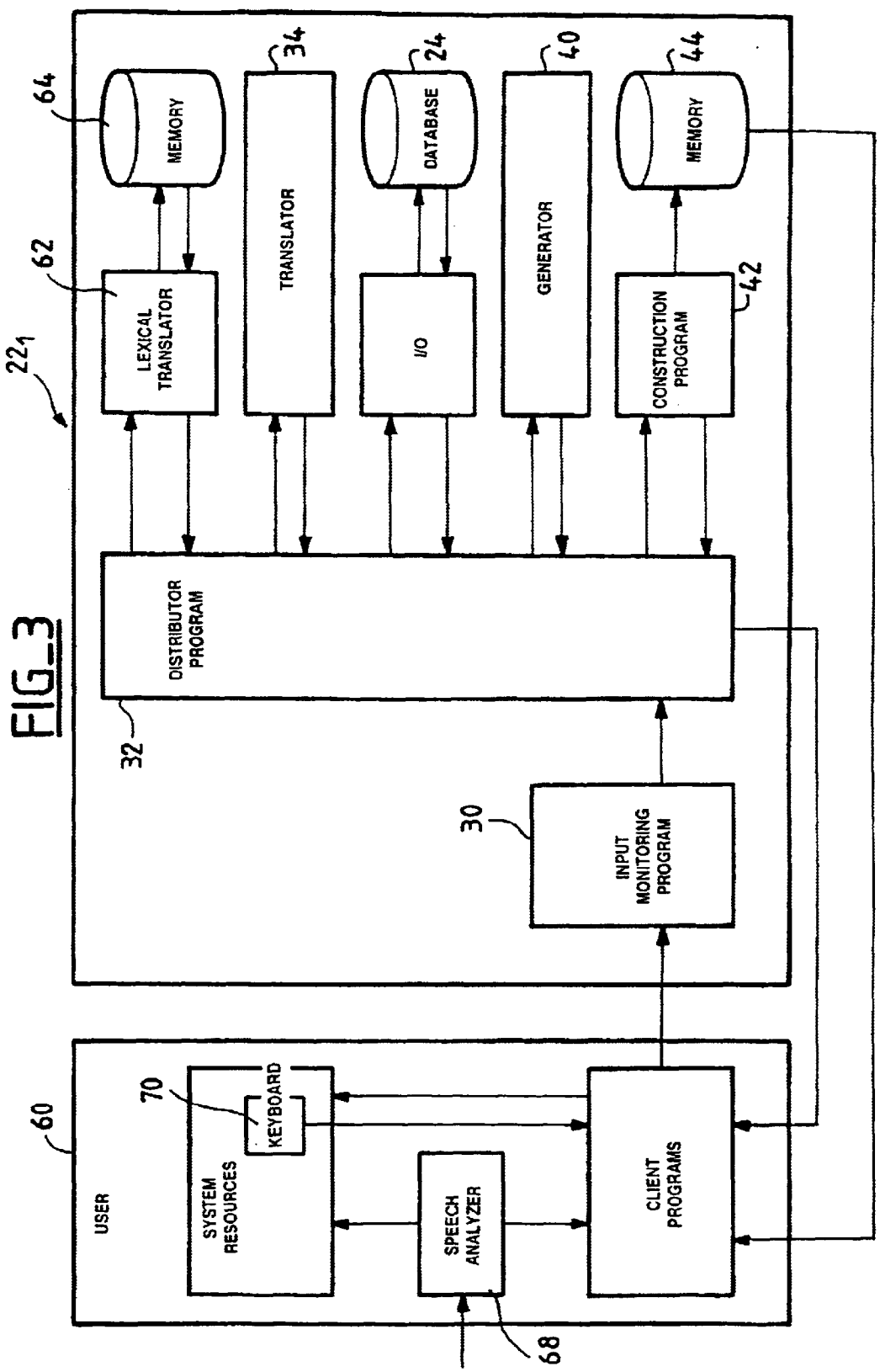
FIG_3

SERVER FOR SEARCHING FOR INFORMATION IN A NETWORK OF DATABASES

The invention relates to a server for searching for information in a network of databases, in particular the Internet.

BACKGROUND OF THE INVENTION

When users do not know the address of a remote database server that may contain information they require, they often perceive discovering that address as difficult. The user logs on to a specialist database, referred to as a "search engine", and formulates a request made up of keywords and logical operators such as the AND and OR operators. Gaining the ability to compose that kind of request entails a learning process that puts off many users.

There are also dedicated servers supplying lists of addresses organized like a printed directory. Servers of that type are difficult to locate, however, and they are not always easy to use.

What is more, navigation servers, whether they constitute search engines or not, supply responses in the form of pages which are displayed on a screen with a standardized presentation that does not necessarily suit all users.

Furthermore, in conventional servers, search results are processed by a common gateway interface (CGI) which cannot totally guarantee the confidentiality of calls and which is easily saturated when a plurality of users are on-line.

OBJECTS AND SUMMARY OF THE INVENTION

The invention remedies the above drawbacks.

It provides a server which includes storage means for storing information relating to users and to the databases of the network, means for receiving a request to search for information in a database of the network and means for generating a response in the form of a user interface and allowing for the characteristics of the person conducting the search.

Accordingly, selecting the databases and/or the characteristics of the user interface takes account of the particular features thereof, which makes the process easier for the user. In particular, personalizing the user interface makes it easier to use, for example because the interface is then matched to the user's computer and peripheral devices and because in the proposed response the choice of servers is limited to those containing information suited to the user. Thus if users want to shop on-line, the responses could be limited to servers of vendors close to their home.

This ease-of-use can also simplify making the original request submitted to the server, since the search field can then be limited to suit the characteristics of the user, the number of keywords to be sent can be reduced and graphics or text elements representing the required information can be used. For example, users can have on their application a first set of graphics elements with which they start the search and in response to which the server sends them other graphics elements enabling them to refine their search and which are preferably personalized.

For example, the characteristics of users which can be entered into the memory of the server relate to their home, age, sex, tastes, and ability to use the available navigation tools (or, more generally, the available data processing tools and hardware).

Thus, for the same enquiry, the selection and presentation of data can be substantially different according to whether the user is a 12-year-old child or an adult.

The selection and presentation can also vary according to the tools available to the user, in particular the operating frequency of their microprocessor and the characteristics of their screen, graphics user interface, audio interface, etc.

In an embodiment of the invention the characteristics of the user are updated periodically in the memory of the server taking account of search requests submitted to the server between two updates.

In the preferred embodiment of the invention the storage means or the generator for synthesizing responses in the form of user interfaces is accessed via the combination of a multithread server program for distributing or sequencing processing tasks and other tasks and which allocates a task (thread) to each user who submits a request. Thus a plurality of users can be satisfied virtually simultaneously without having to increase the number of server programs, unlike the CGI interface, which requires multiple starting of the main program. In other words, a multithread server program of the type used in this embodiment is constantly listening out for requests and does not need to be restarted each time a new request arrives. It therefore retains a limited memory space, whereas with a CGI interface a new memory space must be allocated to each request.

The invention is not tied to a particular network access or server technology. Nevertheless, implementing it in a telecommunications system is facilitated if that system includes a subscriber management station. This is because, in this case, the management station includes a memory containing characteristics of subscribers and the server of the invention can use them.

In an example of a telecommunications network of this type, which employs satellites in low or medium orbit, coverage is divided into terrestrial areas each having a radius of several hundred kilometers. Each subscriber to the network logs on to the network via a management station and calls between a network subscriber and the management station use reception and re-transmission means on board a satellite.

The present invention provides a server intended to facilitate searching for information in a network of databases, such as the Internet, which server includes a database containing the addresses of the databases of the network and an indication of the contents of those bases. The server includes storage means for storing data characteristic of users, that data being selected, for each user, from the group including the following characteristics: home or place of work, age, sex, address, interests, personal details, ability to use data processing tools and hardware characteristics. Means are provided for selecting database addresses to be supplied to the user and/or the presentation of the selection allowing for the characteristics of the user.

In an embodiment of the invention, requests submitted by users are interpreted by a translator before they are communicated to the database.

The server includes a generator for synthesizing objects or applications, in particular intelligent multimedia objects or applications, to be sent to the user and parameterized either to provide access to a particular address or to generate a particular request in the database.

Intelligent multimedia objects include small programs which can be interpreted by a virtual machine, such as JAVA, JAVASCRIPT or VBSCRIPT programs.

In an embodiment of the invention, objects or applications to be sent to a user are chosen from the group including: icons, animated objects, texts, sound, and three-dimensional images.

In an embodiment of the invention, the server includes a memory for storing the selected data supplied to the user at least temporarily and for sending the user the address in the selected data memory of the data sent.

In an embodiment of the invention, the server includes a lexical translator for converting requests submitted in natural language into interpretable requests.

The server preferably includes means whereby the selected data communicated to the user is in the form of a user interface.

An example of the server includes a connection to a subscriber management center of a telecommunications network, that connection enabling loading of the storage means that store the data characteristic of users.

The server can include means for updating the characteristics of users as a function of search requests previously received from the user.

In an embodiment of the invention, the server includes means which are on standby at all times, waiting to receive requests from users and to activate a request distributor.

BRIEF DESCRIPTION OF THE DRAWINGS

Other features and advantages of the invention become apparent from the following description of embodiments of the invention, which is given with reference to the accompanying drawings, in which:

FIG. 1 is a simplified view of a network of databases and users with a server of the invention, FIG. 2 is a diagram of a server of the invention connected to a subscriber terminal, and FIG. 3 is a view analogous to that of FIG. 2 but relating to a different embodiment.

MORE DETAILED DESCRIPTION

FIG. 1 is a simplified overview of a system and a method of the invention and shows a subscriber equipment 20, a server 22 with a database 24 of the invention and a server $26_i$ with a remote database forming part of a plurality of such servers.

Each user searching for information activates a multimedia interface of their client program which sends a request to the server 22 including the database 24 containing information relating to the servers $26_1$, $26_2$, . . . , $26_i$, . . . of the network. In the invention, the database 24 contains information about the users 20 and their hardware.

In this example, the server 22 has two functions. Its first function is to assist users to refine their searches using personalized graphics means so that the system formulates a set of increasingly more precise requests. Users can always submit requests in natural language. This first function constitutes the navigation phase proper. The second function supplies a list of servers or services, taking account of the characteristics of the user stored in the database 24.

Each of these functions is implemented by sending the client 20 data in the form of a personalized user interface and comprising icons, sound, text, animated images, or intelligent graphics objects, for example.

Thus the user interface supplies a list of services $26_i$ presented in a format which, in the usual way, provides easy access to the services by operating a simple physical interface, such as a mouse.

FIG. 2 shows an embodiment of the server 22 and the resources to be installed on or downloaded in real time to the user's client station.

In the server 22, all resources or functions are essentially implemented in the form of programs.

The server includes an input program 30 which can connect to all users. The program 30 is constantly on standby and receives request data 31 from the client programs of users. The data includes a user identification. The program 30 is a multithread server program which does not need to be restarted for each new user request, which limits memory occupation. A multithread program is described in "Le grand livre Windows NT4" ["The Windows NT4 big book"], for example.

On the receipt of a new message, the input program 30 activates a distributor program 32 (this is referred to as a new thread) and sends it the received data. The distributor program 32 first sends each request to a translator 34 which converts a request associated with a graphics object or expressed in natural language by the user into a language that can be interpreted by other applications or programs of the server.

The translator 34 returns the translated request to the distributor 32 which sends it to the database 24 via a database interface 36.

The database 24 contains a list of servers $26_i$ available on the network and the address of the information that they can provide. In the invention, it also contains data relating to users. It will be recalled that the address supplied is a unique address, which includes not only the address of the server but also the address of the selected information in the server. The user data concerns their personality, preferences, hardware and home.

The user data is preloaded or entered on-line. It concerns the age, sex, interests and preferences of the user, for example. The data relating to the hardware available to the user includes a full description of the hardware, for example, such as the characteristics of the user's computer and a list of peripheral devices and their particular features (printer type, monitor type, etc.).

On the basis of the request supplied by the interface 36 and the data contained in memory, the base 24 selects the elements to be communicated to the user, i.e. the services $26_i$ to which the user can connect. The base 24 also supplies information relating to the presentation selected to suit the characteristics of the user. These can either be characteristics of the user forwarded to the distributor 32 via the interface program 36 or else a user interface preselection.

The expression "user interface preselection" refers to a description of the interfaces to be supplied to the user. This description is communicated to the distributor 32 via the interface 36.

In all embodiments of the invention, the distributor 32 supplies the list of user characteristics or the description of the interface to a generator 40 for synthesizing applications or objects to be downloaded to the user. The generator 40 includes a library of objects and/or applications and means for combining objects or applications with service addresses supplied by the base 24.

The objects or applications can take various forms, such as icons, animated objects, in particular those referred to as Java applets, ActiveX programs or scripts, such as Javascripts and Vbscripts, or text, sound, video images, etc. These objects or applications are sent to the distributor 32, together with the user address, of course.

The distributor 32 sends objects synthesized by the generator 40 to a user interface construction program 42. The user interface is stored in a memory 44 at an address which is communicated to the user 20 via an output 46. The address of the interface in the memory 44 is sent to the output 46 via the interface 42 and the distributor 32. The user interface, i.e. the objects produced by the generator 40 and assembled by the program 42, are sent directly from the memory 44 to the user 20, i.e. downloaded. The address in the memory 44 is sent to the user interface in a different way because the user's software, for example a Netscape or Microsoft browser, is controlled by a Java applet which can only download a page at a given address. Accordingly, rather than download the page to the user's system with its entire content, which would increase the load on the distributor 32 and make the client applet more complex, file transfer is delegated to the conventional HTTP server (not shown) and the distributor can therefore release the memory sooner.

The interface corresponds to a particular screen image on the system of the client 20.

The user interface is not permanently stored in the memory 44 but is deleted when the call between the server 22 and the client 20 concerned has terminated.

The data contained in the user interface enables the user either to connect to the services $26_i$ selected by the server or to execute other requests calling up the display of new interfaces containing graphics objects more relevant to the search.

Users therefore see on their screen and/or hear via their audio interface data whose presentation is suited to their personality, requirements, preferences, and home or work address.

The resources in the user's system for receiving the interface (program) from the server 22 are symbolized by the block 48. Their means of communicating with the network and the server are represented by the block 50, which includes the browser.

In the embodiment of the invention shown in FIG. 3, the server $22_1$ is analogous to the server 22 shown in FIG. 2 but differs from it in that the translator 34 is preceded by a lexical translator 62. The translator 34 merely converts data communicated to it into program language. The lexical translator 62 ensures that the translator 34 understands the data supplied to it. In other words, the lexical translator 62 includes a dictionary in a memory 64 for interpreting terms communicated to it so that they can be interpreted unambiguously by the translator 34.

Moreover, in the example shown in FIG. 3, in order to emphasize the diversity of resources on the user's system, the latter is shown as including a speech analyzer 68 for supplying request information to the monitoring program 30, as well as a keyboard 70.

What is claimed is:

1. An apparatus to facilitate searching for information in a network of databases, comprising a server system comprising:
   a database containing,
   addresses of respective databases of the network of databases,
   information on contents of the databases of said network of databases, and
   means for storing data that is characteristic of a user;
   means for selecting, allowing for the characteristics of the user, the database addresses to be supplied to the user and a presentation of the selection; and
   means for communicating the presentation to the user, wherein
   (a) a user interface is communicated to the user via a memory, and
   (b) an address of the user interface is communicated to the user via an interface construction program and a distributor, and
   wherein said characteristics of the user are selected, for each user, from the group including the following characteristics: home or place of work, age, sex, address, interests, personal details, ability to use data processing tools and hardware characteristics.

2. A method for providing a user-personalized search of a network of databases, the method comprising:
   monitoring for a user-initiated request;
   collecting and storing data, wherein the said data is periodically updated and comprises user characteristics and database information;
   synthesizing an object or an application, wherein the user characteristics are applied to contents of the network of databases to generate a synthesized object or a synthesized application with a corresponding address;
   constructing a user interface, wherein the synthesized object or the synthesized application is assembled for presentation to a user;
   distributing a user interface, stored in a memory at an address, wherein
   (a) the address is communicated to the user via an interface construction program and a distributor; and
   (b) the user interface is communicated to the user via the memory.

3. The method recited in claim 2, wherein the user characteristics are selected from the group consisting of:
   home or place of work, age, sex, address, interests, personal details, tastes, ability to use the available navigation and processing tools, and hardware.

4. The method recited in claim 2, including a lexical translation of the request, wherein the translation further comprises:
   converting the request, when supplied in natural language, into an interpretable request;
   and communicating the interpretable request to the database.

5. The method recited in claim 2, wherein the monitoring step is constantly on standby waiting to receive requests from users and to activate a request distributor.

6. A signal-bearing medium tangibly embodying a program of machine-readable instructions executable by a digital processing apparatus to perform a method for providing user-personalized searches of a network of databases, said method comprising:
   monitoring for a user-initiated request;
   collecting and storing data, wherein the said data is periodically updated and comprises user characteristics and database information;
   synthesizing an object or an application, wherein the user characteristics are applied to contents of the network of databases to generate a synthesized object or a synthesized application with a corresponding address;
   constructing a user interface, wherein the synthesized object or the synthesized application is assembled for presentation to a user;
   distributing a user interface, stored in a memory at an address, wherein
   (a) the address is communicated to the user via an interface construction program and a distributor; and
   (b) the user interface is communicated to the user via the memory.

7. The signal-bearing medium embodying a program for the method recited in claim 6, the method including a lexical translation of the request, wherein the translation is further comprised of:

converting the request, when supplied in natural language, into an interpretable request and communicating the interpretable request to the database.

8. A method for providing user-personalized searches of a network of databases, the method comprising:

a means for monitoring for a user-initiated request;

a means for collecting and storing data, wherein the said data is periodically updated and comprises user characteristics and database information;

a means for synthesizing an object or an application, wherein the user characteristics are applied to contents of the network of databases to generate a synthesized object or a synthesized application with a corresponding address;

a means for constructing a user interface, wherein the synthesized object or the synthesized application is assembled for presentation to a user;

a means for distributing a user interface, stored in a memory at an address, wherein (a) the address is communicated to the user via an interface construction program and a distributor; and (b) the user interface is communicated to the user via the memory.

* * * * *